A. BREDENBERG.

BOOKBINDING MACHINE.

APPLICATION FILED FEB. 6, 1917.

Reissued June 11, 1918.

14,485.

4 SHEETS—SHEET 1.

Inventor
Alfred Bredenberg
By Rogers, Kennedy & Campbell,
his Attorneys.

A. BREDENBERG.

BOOKBINDING MACHINE.

APPLICATION FILED FEB. 6, 1917.

Reissued June 11, 1918.

14,485.

4 SHEETS—SHEET 2.

Inventor
Alfred Bredenberg
By Rogers, Kennedy & Campbell,
his Attorneys.

A. BREDENBERG.

BOOKBINDING MACHINE.

APPLICATION FILED FEB. 6, 1917.

Reissued June 11, 1918.

14,485

4 SHEETS—SHEET 3.

Inventor
Alfred Bredenberg
By Rogers, Kennedy & Campbell,
his Attorneys.

A. BREDENBERG.
BOOKBINDING MACHINE.
APPLICATION FILED FEB. 6, 1917.
Reissued June 11, 1918.
14,485.
4 SHEETS—SHEET 4.
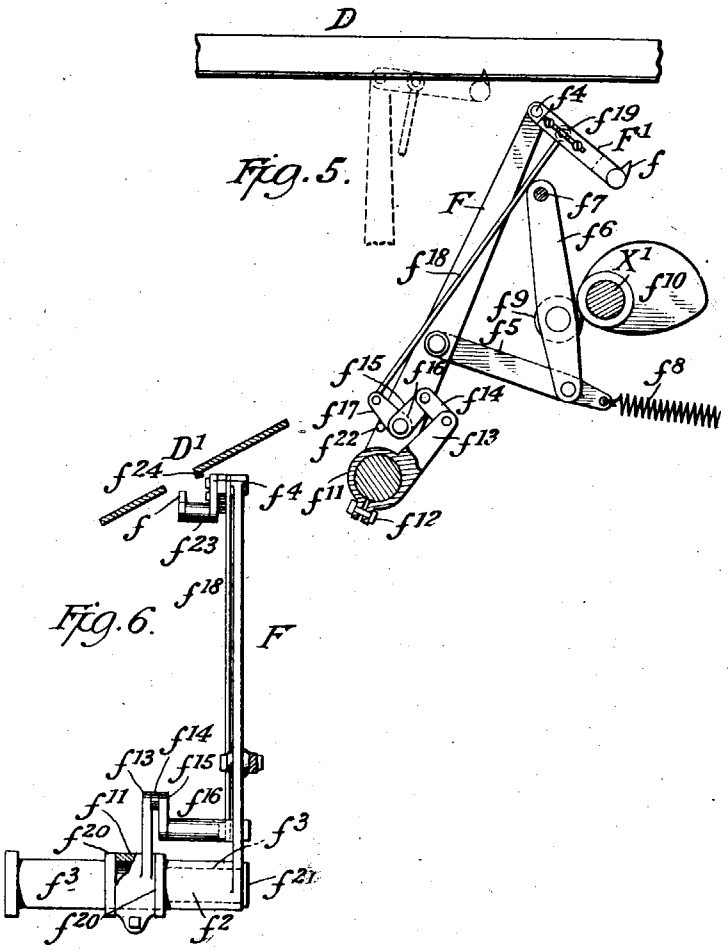
Fig. 5.
Fig. 6.
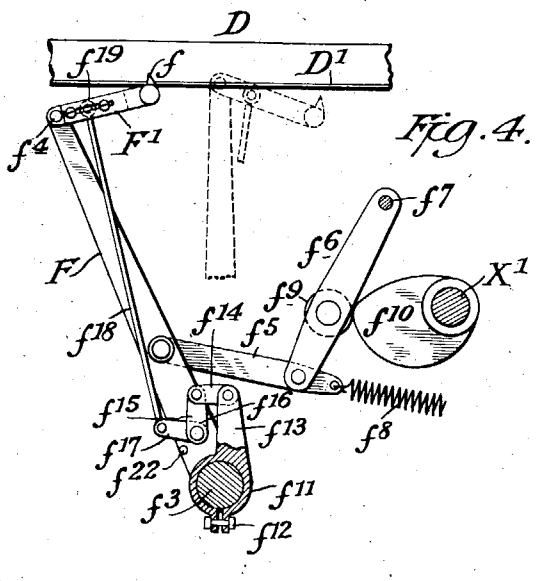
Fig. 4.
Inventor,
Alfred Bredenberg
By Rogers, Kennedy & Campbell,
his Attorneys

UNITED STATES PATENT OFFICE.

ALFRED BREDENBERG, OF CHAMPLAIN, NEW YORK, ASSIGNOR OF ONE-HALF TO THE SHERIDAN IRON WORKS, A CORPORATION OF NEW YORK, AND ONE-HALF TO T. W. & C. B. SHERIDAN COMPANY, A CORPORATION OF NEW YORK.

BOOKBINDING-MACHINE.

14,485. Specification of Reissued Letters Patent. Reissued June 11, 1918.

Original No. 1,051,074, dated January 21, 1913, Serial No. 623,315, filed April 25, 1911. Application for reissue filed February 6, 1917. Serial No. 147,017.

*To all whom it may concern:*

Be it known that I, ALFRED BREDENBERG, a citizen of the United States, and a resident of Champlain, Clinton county, New York, have invented certain new and useful Improvements in Bookbinding-Machines, of which the following is a specification.

The present invention relates more especially to bookbinding machines operating on the "trim-and-glue" system, and involves a transferring mechanism adapted to assist or render automatic certain operations of such binding machines; although features of the invention might be equally useful in various other kinds of binding machines.

The invention has for an object to provide a means for successively transferring a series of objects to be bound, such as signature-groups, from the delivery of a gathering mechanism into justified position within a series of clamps, for such binding or other operations as are to be performed upon the same; the gathering and binding mechanisms being thus operatively associated into a single book making machine; and other and more specific objects will appear hereinafter in the following description or will be obvious therefrom.

The term signature-group shall be used herein in a representative sense as including any analogous object consisting of assembled components, such as a pile of single sheets, designed finally to constitute a book or analogous article, such as a pad. My automatic combined gathering and binding machine, however, is adapted to operate not merely upon single sheets, or once-folded sheets, or leaflets, but the regular commercial signature, which I will refer to as a "multifold" signature, in which the printed sheet is folded at least twice, and usually three or more times, resulting in two, four, or more folds at the back, with four or more sheets and eight or more pages in each signature. My prior Patent 1,177,600 shows a mechanism adapted to gather and automatically deliver a procession of groups of loosely assembled multifold signatures, and my prior Patent 1,073,324 shows a procession of clamps, and devices adapted to bind together each group of multifold signatures, namely, by the system of trimming off the back folds to expose every individual sheet, and then gluing together the back edges of all of the sheets, and then usually reinforcing them by applying a backing over the glued edges. The present invention in one aspect is a completely automatic book making apparatus, in which are operatively united the essential features of gathering and binding mechanisms such as those of my said two prior patents.

Mechanisms are well known, and I do not make claim to the same, wherein groups of signatures or sheets issuing from a gathering, collating or assembling mechanism are "wire stitched," that is, secured together by staples, while under compression, the book in some cases being held stationary and in others kept in motion, the stapling devices in the latter case being either rotated or reciprocated, so as to drive the staples during the forward book movement; while contrarily to all of these the present invention pertains more particularly to the very different kind of book manufacture which yields a flexible book, namely, by what may be specifically described as the trim-and-glue system.

I believe that in the present invention I am the first to produce a completely automatic gathering and binding apparatus in which multifold signatures may be gathered and delivered in a procession of groups, and thereafter conveyed forwardly under secure clamping pressure, and with back edges protruding past a device for trimming off the back folds, and thereafter a device for applying glue to the trimmed back edges, and usually a subsequent device for applying a backing or cover to the glued edge, before the setting of the glue and discharge of the bound book.

The present invention consists in the novel parts, constructions, contrivances and combinations hereinafter shown or described.

*Description of drawings.*

The accompanying drawings referred to in the following description and forming a part hereof, illustrate one embodiment of the present invention, the same serving in connection with the description to explain the principles of the invention.

In the drawings, Fig. 4 is a front detail view of one of the contrivances shown in Figs. 1, 2 and 3; Fig. 5 being a similar view of the same in a different stage of operation; Fig. 6 being a righthand view thereof.

*Enumeration of features.*

Figure 1:
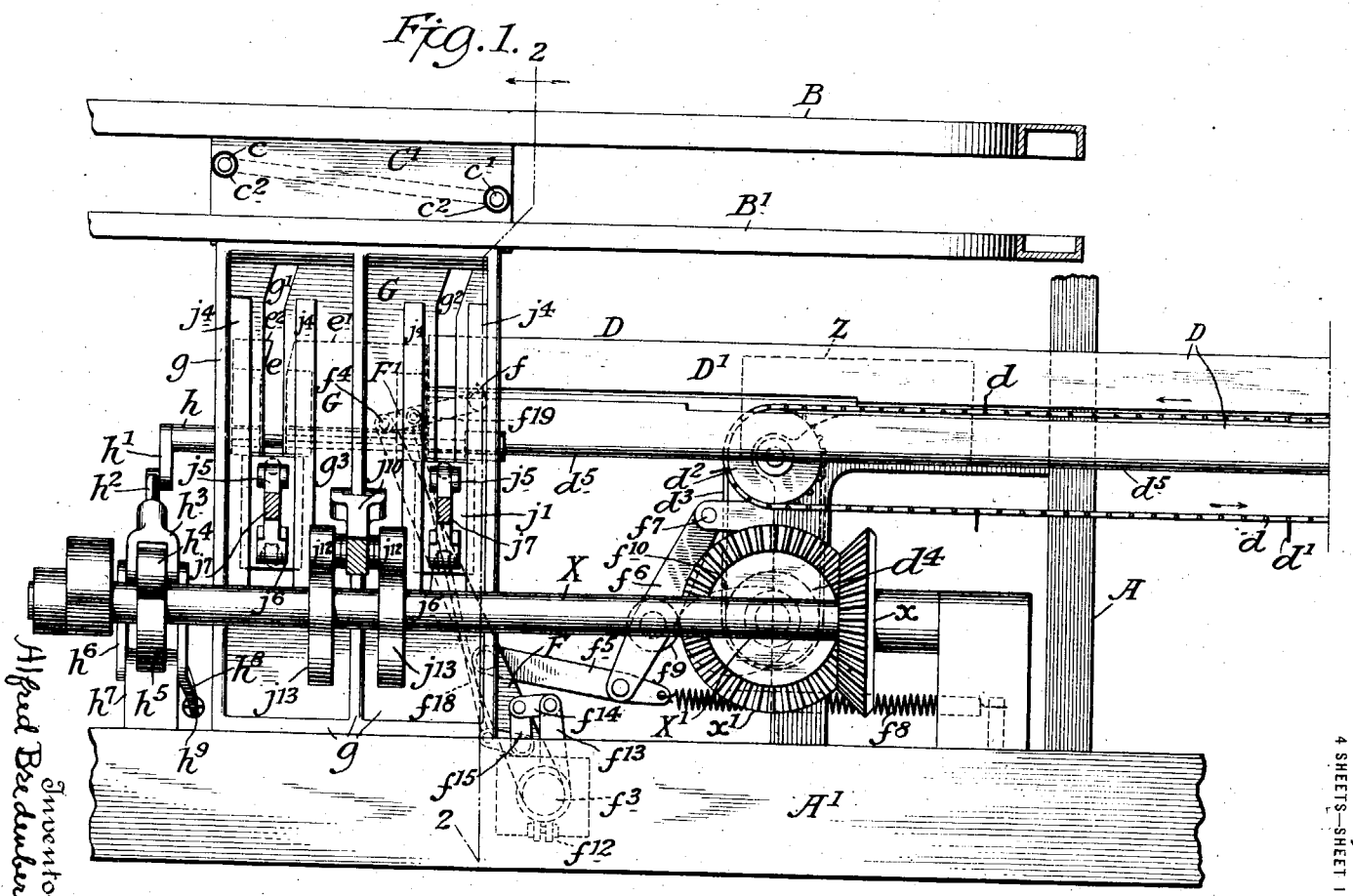
Figure 1 is a front elevation partly in section of parts of a book binding machine, including a transferring mechanism embodying the present improvements.

The present invention involves a book binding machine including in combination a signature gathering mechanism, a binding mechanism comprising a clamp, and means intermediate said gathering and binding mechanisms for transferring each object (signature-group) from the delivery of the gathering mechanism to said clamp; each of the objects being during its transfer, in the preferred embodiment, swung from the flatwise position in which it is delivered by the gathering mechanism to the position (upright) in which it is moved into the clamp. The term clamp is used in a sense to include equivalents.

Especially the invention is directed to the successive automatic gathering, clamping, trimming and gluing of the books, to give flexible binding.

Also, an important feature is that the path of transfer or infeed to the clamp is a rising path, so that the book approaches the clamp at a substantial angle to the clamp travel, and is thereby accurately introduced into the clamp, all in proper time with the clamp operation.

More specifically looked at the invention includes the following features:

The transferring mechanism hereof comprises a distinct part which may be termed a holding member or holder which is adapted to have the objects (signature-groups) fed into it one at a time, combined with a moving member for moving or lifting each successive object from the holder into engagement with a clamp or the like.

According to another feature of the invention the holder is of such character as to receive each successive signature-group or other object flatwise and thereafter swing or tip upward into substantially upright position preparatory to a vertical (preferably ascending) movement of the object into a clamp or the like.

According to still another feature a moving or lifting member is contemplated which engages with the object in the holder and moves bodily from the holder (upwardly or downwardly) toward the clamp, carrying the object thereto.

According to still another feature is contemplated a contrivance for shifting the objects to the holder, comprising an arm or finger which reaches out for each successive object and draws it into proper position in the holder this contrivance shown as coöperating with the delivery of a gathering mechanism.

According to still another feature is contemplated a certain clamp-operating contrivance which serves to open and close a clamp in harmony with the operations of the other parts of the mechanism.

As further features of the present invention are justifying or registering stops serving to insure the accurate positioning of each object so that, when it has been engaged in the clamp for any desired subsequent operations, it will occupy the precise necessary position.

Each of the features of this invention above referred to is thought to be novel in itself and also when employed in conjunction with the others or other of said features.

The above and other features of the invention will be more particularly set forth in the following detail description of one instance or embodiment.

Reference will now be made to the embodiment that is illustrated in the drawings, hereof, in which a signature-group Z is indicated as the object handled by the mechanism.

*General parts of machine.*

Some of the main portions of the machine, as to which *per se* no claim of novelty is herein directed, will first be described, and thereafter the novel mechanism illustrating the present invention will be set forth. The machine has a frame A carried on a base A′, and certain specific frame parts that coöperate with the transferring mechanism will be hereinafter described in connection with the latter.

*Binding mechanism.*

The binding mechanism may be mounted on the frame and base A, A′, separate from the gathering mechanism, which may have an independent frame and base, so that my complete apparatus consists of two units connected by a transferring conveyer.

Figure 3:
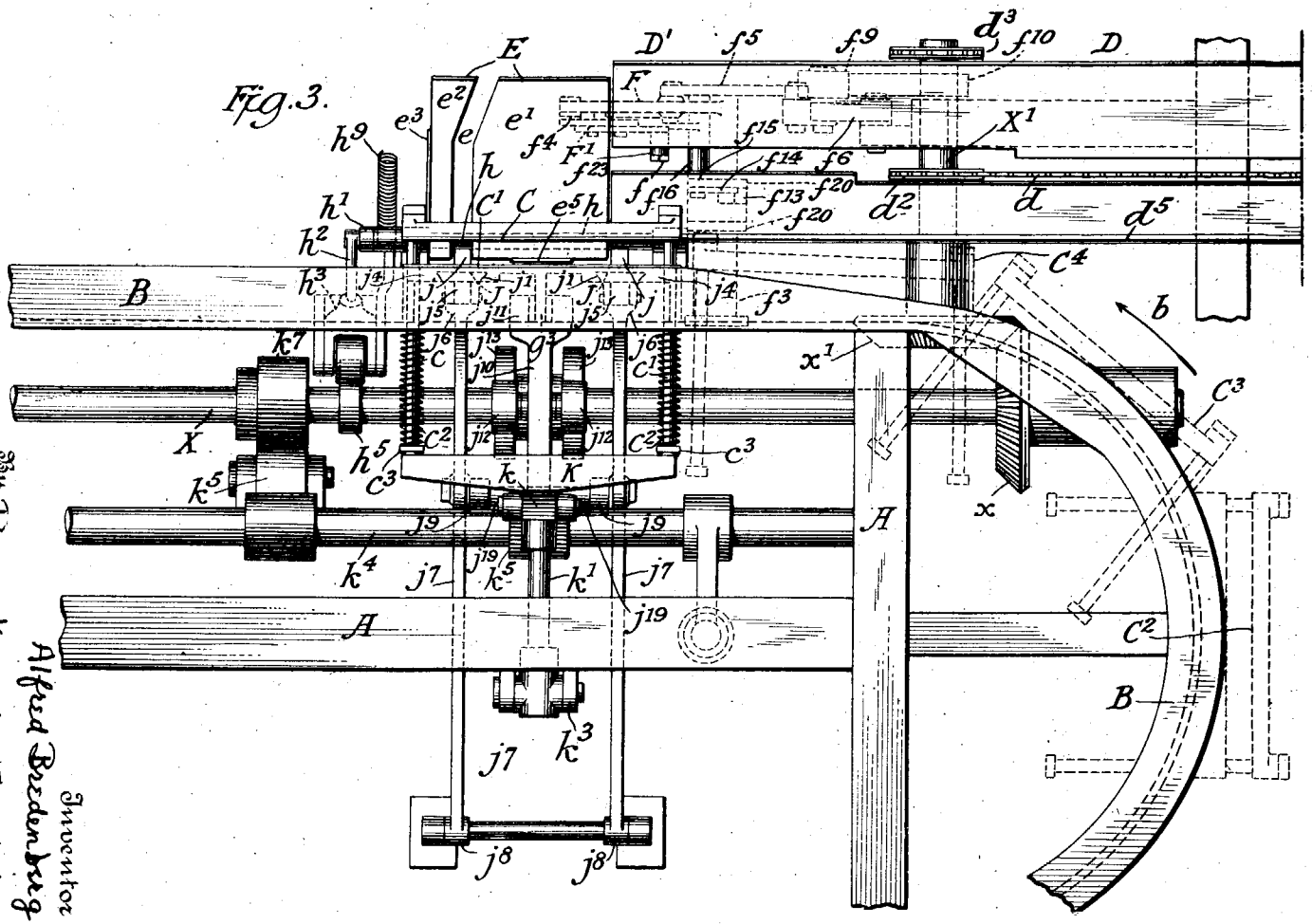
Fig. 3 is a plan view of the mechanism seen in Figs. 1 and 2.

In the upper part of the frame is an upper guide B and lower guide B′ shown in the form of channels adapted to receive between them and guide a carrier of any known design comprising clamps C, C′, intended to hold a book, signature-group or other object to be treated. The said guides and carrier constitute a convenient and well-known means of successively presenting a series of signature-groups to the various instrumentalities comprised in a book binding machine; and for convenience there may be an extended series or procession of clamps connected in a train and intended to move intermittently along the guides B, B′, which may take the form of an endless track, as clearly seen in Fig. 3, so that each carrier clamp on completing a cycle of operations will stand at position ready to repeat. The guide is indicated as having a straight stretch on either side of the machine and a curved connecting portion at either end. The arrow *b* indicates the direction of travel of the carrier; and several clamps are indicated in Fig. 3 in dotted lines in addition to the one which is in coöperation with the transferring mechanism forming the particular subject of this invention. Thus $C^2$ indicates a carrier clamp which has been opened to release a book that has completed its treatment; $C^3$ and $C^4$ indicate the succeeding positions in which the clamp has closed. The clamp C, C′, shown in coöperation with the present invention, is indicated in open position. When a clamp has been opened it is preferably closed by means of springs sufficiently powerful to hold the object firmly within the clamp during the book binding, covering or other operations which may be performed. Connected to the outer clamp part C for this purpose are a pair of rods or stems *c*, *c*′, which extend through apertures in the inner clamp part and are encompassed by helical springs $c^2$ having considerable length so as to secure substantial uniformity of pressure for varying thicknesses of objects. At the inner ends of stems *c*, *c*′, are heads $c^3$, $c^3$, adapted to be pressed upon by a means which will be hereinafter described, for the purpose of sliding the stems outwardly and opening up the clamp against the resistance of the springs $c^2$ which subsequently close the clamp.

The above will be seen to be a substantial description of the binding mechanism of my prior Patent 1,073,324, the nature and operations of which may be ascertained by reference to the prior patent. After entering the clamp C at the feeding-in position, each signature-group is carried advancingly around the horizontal circuit shown and past the several devices for performing operations on the group.

The clamp C is shown of the type of my Patent 1,073,324 and very powerful in that the opposed plates are drawn together with a parallel movement through front and rear guide studs. Each clamp takes a group of unfastened signatures from, so as to disengage, the transfer means, and holds the same with the signature back folds free or protruding to permit the trimming and other operations. The several clamps are guided and advanced to move past, that is, to and beyond, the trimming and other devices, so as to carry the books from one operation to another, the clamps thus constituting a series or procession, moving in an endless circuit, forwardly only, rather than to and fro along a linear path.

*Gathering mechanism.*

Portions of a gathering machine or mechanism are shown as illustrative of various mechanisms in conjunction with which the present invention might be employed, and such gathering mechanism will not be described in full detail as it is the subject of protection and description in another application filed by me, April 28, 1911, Serial No. 623,872, which has since resulted in my aforesaid Patent 1,177,600. A gathering mechanism is one which from supplies of signatures or the like selects one of each variety and assembles them into a signature-group, the actual assemblage being performed if desired upon a support or carrier along which the assembled books are caused to travel. Such a support D is indicated in Fig. 1, it being slotted and having a traveling chain or sprocket *d* projecting through such slot, so as to stand above the support surface.

The support and chain extend through the gathering mechanism and are continued outwardly considerably beyond the point where the completed group issues from the machine, this being for the purpose of conveying the group from the delivery point and transferring it toward the binding mechanism clamp. The sprocket chain *d* passes around a sprocket wheel $d^2$ mounted on a shaft which has another sprocket wheel engaged by a second sprocket chain $d^3$, which in turn engages sprocket wheel $d^4$, mounted on the same shaft X′ as the bevel gear wheel hereinafter to be referred to, from which the sprocket chain *d* obtains its motion. A flange $d^5$ along the lower edge of the inclined carrier or support D is contacted by each assembled book and keeps the same from falling from the support. Each pin *d*′ on reaching the sprocket wheel $d^2$ passes downwardly out of the slot, and the accumulated signatures or assembled book in front of such pin is thereby delivered at the left end of the support D, which left end may therefore be designated a delivery support D′.

Portions of the mechanism to which the present improvements more particularly relate, will now be described.

*Group transferring means.*

I will first generally describe the operation of transferring the successive groups from the gatherer to the clamp. The delivery of the gathering mechanism is the end at which each accumulating signature-group receives the final signature before passing along toward the binding mechanism. From this point the outer continuations of the support D and the chain *d* serve to convey the group toward the delivery support D′, and, as will be explained, the conveying is then taken up by a reaching-out contrivance F, which pulls forwardly the group upon a holder E, the holder then swinging the group upright, and a lifting member J then conveying the group directly into the clamp. Each group, therefore, is transferred from the gathering machine delivery to the clamp by conveying means comprising four parts, the extensions of the support and traveling chain, the reaching-out contrivance, the swinging holder, and the lifting member; and during the transfer is swung from flatwise to upright; but I do not limit myself to such particular means of transferring the successive groups from the gatherer into the clamp. Having described the extending support and chain D, $d$, I will describe the remainder of the transfer means.

*Group holder.*

Attention is first directed to the member E, which is adapted to have the signature-groups or other objects successively fed to it prior to their being moved therefrom to a clamp or the like; and said member E may for convenience be termed a holder, since it receives and holds each object intermediate the two described movements of the latter. The holder E is arranged in line with the delivery support D′ before referred to, that is, so as to hold the assembled signatures substantially flatwise; and as seen in full lines in Fig. 2, the holder E and consequently the delivery support are not exactly horizontal but substantially inclined for a purpose which is only incidental to the present invention, and insufficient in extent to change its character from what it would be if normally strictly horizontal. The holder E is seen in Fig. 1 in dotted lines, and it is clearly seen in Fig. 3 in plan view to consist of a platen actually shown as divided by a slot $e$ into a main portion $e'$ and a smaller portion $e^2$, the slot being inclined at least at its upper end and serving a purpose which will hereinafter appear. The objects having to be fed upon the holder E from right to left, it is provided at its left edge with a flange or stop $e^3$ preventing overtravel of the object and serving to adjust it into proper registration for further action upon it. The holder E has a back plate or support $e^4$, whose fitting will be hereinafter described. At the inner lower edge of the holder is indicated a flange or stop $e^5$ preventing the objects sliding off the inclined holder, said flange being in line with and forming substantially a continuation of flange $d^5$ of the delivery support D′.

Having thus identified the holder E, reference will now be made in order to the following, namely: a contrivance which serves to reach out to the delivery support and draw each object upon the holder; a means of effecting certain movements of the holder E for coöperation with the means hereinafter in this paragraph mentioned; a means for moving each object from the holder E into an open clamp; a means for causing each object upon entering the clamp to move laterally or in its own plane for purposes of adjustment to certain stops; and a means for causing the opening and closing of a clamp in harmony with the other instrumentalities.

*Reaching-out contrivances.*

The reaching-out contrivance comprises a swinging arm F carrying a hand F′ on which is a finger $f$, these parts so located that the finger is capable of extending up through the slot of the delivery support D′ behind a signature-group or book for drawing the same forwardly on to the holder E. The arm F is secured to a sleeve $f^2$ loose upon a stud $f^3$, which is fixed to the frame of the machine, as indicated in dotted lines in Fig. 3, and is incapable of rotation. The hand F′ is pivoted at $f^4$ to the arm's upper end so as to be able to swing to a slight extent to permit the finger $f$ to be moved out of and into the slot of the delivery support.

To swing the arm F there may be employed a link $f^5$ connected at one end to such arm and at the other end to a lever $f^6$ turning about a fixed pivot $f^7$. The link $f^5$ is provided with a spring $f^8$ tending to pull it and the arm F to the right, Figs. 1, 4, and 5, and the lever $f^6$ is provided with a roller $f^9$ adapted to engage the surface of a cam $f^{10}$ mounted upon a shaft X′. By the rotation of said shaft the lever $f^6$ and arm F are oscillated to and from the positions seen in Figs. 4 and 5 respectively, and during such oscillation the movements of hand F′ and finger $f$ are controlled as follows. Mounted on the fixed stud $f^3$ and capable of turning thereon, is a sleeve $f^{11}$ which is provided with a tightening device $f^{12}$ by which any desired amount of friction between the sleeve and the shaft may be secured. The friction sleeve is held in place on the stud by two collars $f^{20}$, $f^{20}$, on the latter, and between one of said collars and a cap $f^{21}$ at the end is held the oscillating sleeve $f^2$ that carries arm F.

The friction sleeve $f^{11}$ constitutes part of the mechanical movement for causing the finger $f$ on each instroke to pass into book-engaging position in the slot and on each outstroke to swing downwardly out of such position. The connections between friction sleeve $f^{11}$ and the finger $f$ comprise an arm $f^{13}$ secured to the sleeve $f^{11}$ and having pivoted to its extremity a short link $f^{14}$, whose other end is connected to one arm $f^{15}$ of a two-arm lever in the nature of a bell crank, having a rotating stud $f^{16}$ projecting from arm F, and whose other arm $f^{17}$ in turn has pivoted to it a long link $f^{18}$ extending upwardly to where it is adjustably pivoted at $f^{19}$ to the hand F′ that carries at its extremity the finger $f$. Fig. 4 represents the parts as having just reached the end of the instroke, and they are about to return outwardly or to the right. The friction of sleeve $f^{11}$ temporarily renders it substantially stationary with stud $f^3$, so that through link $f^{14}$ the movement to the right of arm F effects a slight oscillation of the bell crank $f^{15}$, $f^{17}$, and a pulling down of the link $f^{18}$ and consequently a lowering of the finger $f$ out of the slot of the delivery support. A stop $f^{22}$ on arm F limits the bell crank's rotation in this direction, its rotation in the opposite direction being limited in a manner that will hereinafter appear. The swing of the bell crank is insufficient to permit the friction sleeve and arm $f^{13}$ to remain stationary throughout the entire swing of arm F, and consequently at a certain point the sleeve $f^{11}$ commences to overcome its friction and it thereafter revolves with other swinging parts until the position of Fig. 5 is attained, this being the limit of the outstroke. Thereafter on the return movement of the parts the friction of sleeve $f^{11}$ again takes effect to hold said sleeve and arm $f^{13}$ temporarily, this having the effect of actuating the bell crank to rotate toward the right in Fig. 5 to a considerable degree, and indeed until stopped by the finger $f$ reaching its book-engaging position. The finger $f$ is not formed directly on the hand F′, but, as seen in Fig. 6, is substantially offset therefrom, the hand and finger being connected by a roller $f^{23}$; this arrangement permitting the finger to enter the slot of the delivery support, but preventing the hand from entering it, and the roller $f^{23}$ serves as a stop coming into contact with the edge of the slotted support or a track $f^{24}$ thereunder, and preventing the finger rising above the position seen in full lines in Fig. 4 and in dotted lines in Fig. 5. As soon as the roller $f^{23}$ has been lifted with the finger sufficiently to contact the delivery support, the friction sleeve as before commences to revolve with respect to the stud $f^3$. On the instroke the roller $f^{23}$ will slide along immediately beneath the delivery support and maintain the finger $f$ throughout such stroke in proper book-engaging position.

By the described operations of the reaching-out contrivance a book or other object on the delivery support is reached out for and slid inwardly from said support into the holder, which, as before stated, is normally in line with the support, and the inmotion is continued until the book is brought into contact with the stop $e^3$ of the holder, at which time the book is in position to permit the operations of the instrumentalities hereinafter to be described.

The shaft X′ above referred to may be considered a secondary shaft, the main shaft X being preferably the one to which power is applied for driving the mechanism of the present invention; and said shaft X may be considered as a single machine part taking the form of a shaft and having connections to the several instrumentalities referred to for the purpose of driving all of them in harmony with each other, or in the manner herein specified. The shaft X′ may receive motion from shaft X through a bevel gear $x$ on the latter engaging a bevel gear $x'$ on the former.

*Group swinging means.*

Figure 2:
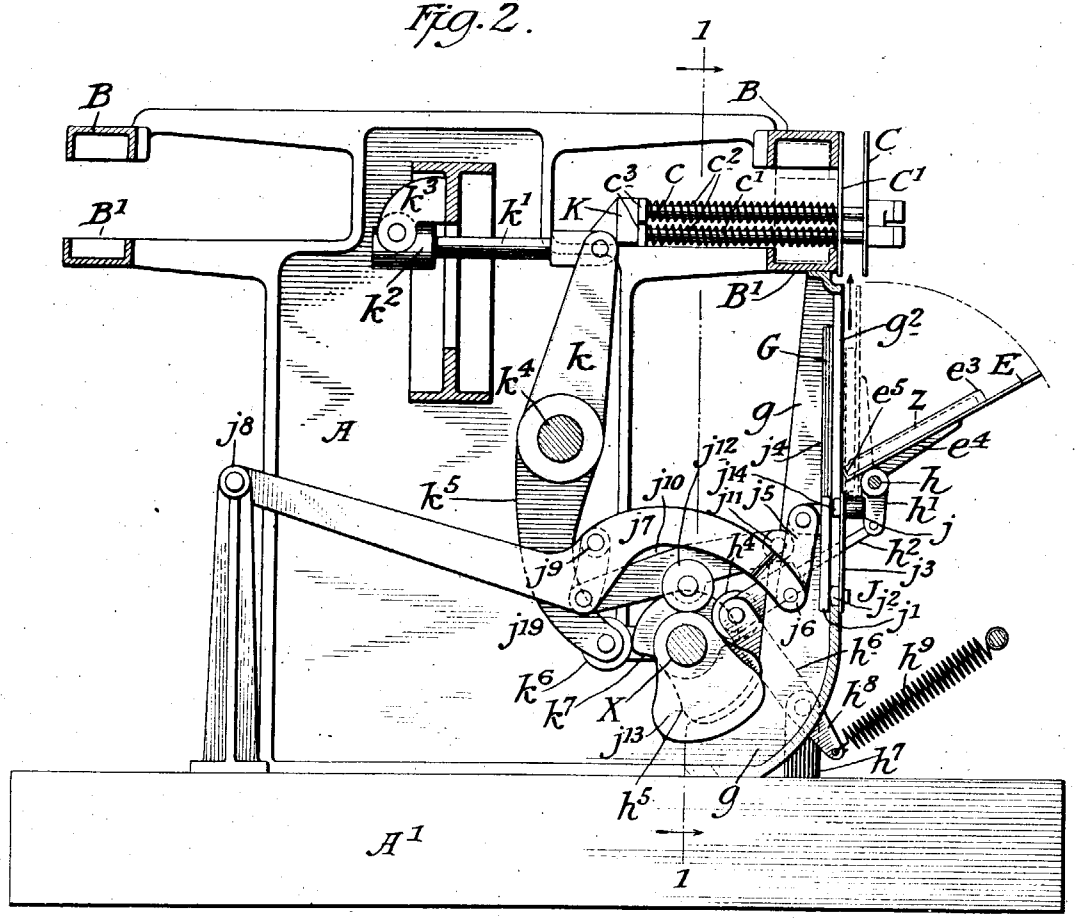
Fig. 2 is a righthand elevation partly in section taken substantially on the plane 2—2 of Fig. 1.

There will now be described the means for swinging the holder E from the position in which it receives a book to the position in which the book is removed from it. Such swinging is substantially from the flatwise to an upright position, and such swinging correspondingly swings the book, enabling the latter to be then vertically moved from the holder into a vertically arranged clamp or the like. In employing the words vertical, upright, etc., it is not done in an absolute sense, since approximate verticalness would obviously suffice, and in any case it is the relative arrangement which is important. Fig. 2 shows the holder E in its substantially flatwise position in full lines, and in dotted lines swung to a substantially upright position, in which latter position in order to hold the book or signatures the holder is brought face to face with an upright retaining part G, said retaining part coöperating with the holder when the latter is first swung upwardly, and thereafter during the vertical movement of the book out of engagement with the holder and into engagement with a clamp. Said retaining part is preferably a fixed part and may constitute a portion of a frame member $g$ which is extended downwardly and is secured to the base A′ at its lower portion and to the guide B′ at its upper portion. The retaining part or wall G is slotted at $g^2$ and $g'$, such slots being generally vertical, but their upper parts at least being inclined for a purpose that will hereinafter appear. The frame part $g$, of which the retaining wall G constitutes a part, is of substantial construction, flanged where desirable, and it forms the base or support for certain movable parts, as will be hereinafter described.

For swinging the holder E an axle $h$ may be employed, to which the holder E and its back plate $e^4$ are suitably secured, and said axle at one end is provided with an arm $h'$ extending to where at its extremity it is pivoted to a link $h^2$, which link at its other end is yoked at $h^3$ and provided within said yoke with a roller $h^4$ bearing upon and actuated by a cam $h^5$, mounted upon and rotating with the main shaft X; and said roller and yoke are guided through a swinging arm $h^6$ pivoted at the upper end of a short standard $h^7$ and having an extension $h^8$ acted upon by a spring $h^9$ in such manner as to tend to retain the roller $h^4$ in contact with the cam $h^5$. The cam $h^5$ is of such contour as to cause first the up-swinging of the holder E, followed by a pause sufficiently long to permit the removal of the book, followed by a down-swinging movement and a pause sufficiently long to enable a new book to be received on the holder.

*Group lifting means.*

The moving or lifting member which vertically shifts the book or other object from the holder E to a clamp, may for convenience consist of a plurality of members such as the twin members J, J, each having an outwardly projecting stud $j$, and working in harmony so as to constitute substantially a single contrivance. Each member J in addition to the projection $j$ on which the book rests edgewise, may comprise a slide $j'$, said slide conveniently located to the inside of retaining wall G, and the projection $j$ extending on the outside thereof beneath the holder E; there being a connection between the slide and projection, such connection consisting of a pin $j^2$ extending through the slot $g'$ or $g^2$ in the retaining wall, and an upright link $j^3$ supporting the projection $j$ at its upper end in such a way as to permit lateral play of the latter, so that it may accommodate itself to the varying positions of the slot as the lifting member moves upwardly and downwardly. The upper end of each link $j^3$ is provided with a follower $j^{14}$, projecting rearwardly into the slot $g'$ or $g^2$ to compel the stud or projection $j$ to conform in its movements with the shape of the slot.

To guide the lifter J in its upward and downward movements, slideways may be provided consisting for convenience of a pair of upright plates $j^4$, $j^4$, secured on the inner side of the wall G, as seen in Fig. 1, each plate $j^4$ being undercut to receive the correspondingly formed edges of the slide $j'$. Thus by sliding the slide $j'$ upwardly and downwardly the studs $j$ are carried upwardly and downwardly in a corresponding manner and additionally are given lateral movements according to the inclined portions of slots $g'$, $g^2$.

To actuate the slides $j'$, $j^2$, to move upwardly and downwardly a link $j^5$ may be pivoted to the rear of each slide and extended to where at its other end it is pivoted within the yoke end $j^6$ of a long lever $j^7$, there being two identical levers $j^7$, as seen in Fig. 3, and each having its far end pivoted at $j^8$ to a fixed part of the machine. A pair of links $j^9$ pivoted to intermediate portions of the respective levers $j^7$, $j^7$, extend downwardly and are connected by a rod $j^{19}$, to which rod is connected the lever $j^{10}$, whose other end is pivoted at $j^{11}$ to the central rib $g^3$ of the frame part $g$. A pair of opposed rollers $j^{12}$ on lever $j^{10}$ bear upon a corresponding pair of cams $j^{13}$ mounted on the same shaft X that carries cam $h^5$, said cams $j^{13}$ having such contour as to cause upward and downward movements of roller $j^{12}$ with pauses between, so that the lever $j^7$ and in consequence the slides $j'$, $j'$, will likewise move upwardly and downwardly with pauses at each end of their stroke.

The same shaft X operating the mechanism just described and also causing the swinging of the holder E, they will work in harmony, the cams being so timed that after the holder has swung upwardly, the lifter then comes into play and from Fig. 2 it will be clearly seen that the studs $j'$ must push upwardly edgewise against the books and force them from the space between holder E and wall G directly into the open clamp C, C′, which is the function of the lifter.

*Group registering means.*

In order to cause the proper registry or to justify each book within the clamp, the following mechanism may conveniently be employed. Reference has already been made to slots $g'$, $g^2$, in the retaining wall G, and to the fact that a follower $j^{14}$ connected to the stud $j$ engages such slots. It has also been made to appear that the holder E has a slot $e$, this receiving the outer extremity of one of the studs $j$, the other stud $j$ being in a position beyond the holder E, and not requiring a corresponding slot. Now all of the slots $g'$, $g^2$, $e$, while generally vertical, are inclined at least at their upper ends, as shown, and the inclinations of all of the slots are the same in position and extent. The result is that the studs $j$ on nearing the end of their up-stroke and at a time when the book is substantially in position within the clamp, are caused to be swung laterally or to the right in Figs. 1 and 3, tending to carry the book more than a sufficient distance in that direction to insure the contact of the book with the stem $c'$ of the clamp, said stem forming a convenient stop for securing the proper adjustment of the book.

*Clamp closing means.*

For opening and closing the clamp C, C′, the following contrivance may conveniently be employed in coöperation with the previously described instrumentalities: A part or bar K is of such shape and so located as to contact with the inner ends of the spring encircled stems $c$, $c'$, to which the movable clamp member C is secured. Bar K causes the opening of the clamp by pushing upon said stems and causes the closing by withdrawing to permit the springs $c^2$ to operate. The rod K is shown attached to the upper end of an arm $k$, which actuates it to move toward and from the clamp, and to steady the same the rod $k'$ is secured at the side of the bar opposite to the clamp extending to where it slides within a slideway or sleeve $k^2$ pivoted between fixed frame parts $k^3$, $k^3$. Arm $k$ is actuated from a shaft $k^4$ extending parallel to shaft X; and said shaft $k^4$ at another point on its length is provided with a second arm $k^5$ extending downwardly to where at its lower end is a roller $k^6$ engaging and rolling upon the surface of a cam $k^7$ secured to shaft X. Said cam $k^7$ is of a contour to cause the bar K to push the stems $c$, $c'$, and thereby open the clamp, followed by a pause, after which the clamp is permitted to close, followed by a second pause to give opportunity for another and empty clamp to be carried by the binding mechanism into position for receiving the succeeding signature-group.

*Operation.*

The preferred operation of the above described parts will be as follows: Assuming a signature-group to have been completed and advanced beyond the delivery end of the gathering mechanism, and thus partially transferred, and delivered on the support D′ by the chain $d$, and assuming an empty clamp to have been presented in the position shown, the action of the transfer mechanism will be the reaching out by the arm and finger F, $f$, engaging the book on the delivery support and drawing it inward until its rests upon the swinging holder E, the book Z being seen in this position in Fig. 2. The holder then swings from the substantially flatwise position shown to an upright position, its flange $e^5$ keeping the signatures in place and the opposed retaining wall G serving in coöperation with the holder E to keep each signature-group substantially upright. The lifter J then comes into play, its studs $j$ contacting directly against the lower edge of the signature-group, and as said lifter rises the group is forced upwardly between the holder and retaining wall, while the studs $j$ are guided by the slots $g'$, $g^2$, in the retaining wall. The clamp C, C′, having previously been opened by the opener or bar K and said clamp standing upright directly above the space between the holder and retaining wall, the group is thereby caused to pass directly into the clamp between its walls C, C′; and the upward movement is continued until the group reaches the proper predetermined height. During the rise of the group the studs $j$ engaging the inclined portions of slots $g'$, $g^2$, are caused to move laterally, swinging about their links $j^3$ and thereby bodily carrying the group of signatures laterally or edgewise toward the right, Fig. 1, until said group comes in contact with the stem $c'$ of the clamp, such stem serving as a stop insuring the accurate positioning of the group. The clamp opener K then withdraws, causing the closing of the clamp by the action of the springs $c^2$. This substantially completes one cycle of operations, following which the lifter J and holder E return to their original positions prior to the transfer of a succeeding signature-group from the gatherer delivery to the next succeeding clamp of the binding mechanism. The different cams referred to are so timed as to bring about the above described operations in the order named.

I have thus described a book binding machine including, in combination: a signature gathering mechanism adapted to automatically gather in flatwise position a succession of groups of loosely assembled signatures; a binding mechanism comprising successively operating traveling clamps adapted to receive and suitably clamp the successive groups of unfastened signatures, at the proper height to permit the binding operations, and means for guiding and advancing such clamps automatically in an endless circuit past, that is, by and beyond, said binding devices; means intermediate said gathering and binding mechanisms for automatically conveying or transferring the successive signature-groups with a rising movement from the delivery end of the gathering mechanism, and thereby infeeding them at a substantial angle with the direction of clamp travel into said successive clamps, and at the same time or during such transfer swinging each signature-group from flatwise to upright position; and means for automatically causing the closing of the respective clamps upon the successive signature-groups.

It will be seen that by reason of the construction above shown and described, a transfer mechanism is provided which answers the objects and affords the advantages of the invention as hereinbefore set forth; and other advantages will be apparent to those skilled in the art.

It is to be understood that the invention in its broader aspects is not limited to the precise construction shown nor to any particular construction by which the invention has been or may be carried into effect, since many changes may be made in the details of the parts without departing from the main principles of the invention and without sacrificing its chief advantages.

What I claim and desire to secure by Letters Patent is:

1. A book-binding machine including, in combination, a signature-gathering mechanism; a binding mechanism comprising a series of signature-group clamps, means for causing the clamps to travel successively through the machine, and means for automatically causing the closing of the successive clamps upon the transferred signature-groups; and mechanism intermediate said gathering and binding mechanisms for transferring the successive signature-groups from the delivery of the gathering mechanism and feeding them into the successive clamps.

2. A book-binding machine including, in combination, a signature-gathering mechanism; a binding mechanism comprising a series of signature-group clamps, each constructed to hold and convey a signature-group with its back edge at the proper height, means for causing the clamps to travel successively through the machine, and means for automatically causing the closing of the successive clamps upon the transferred signature-groups; and mechanism intermediate said gathering and binding mechanisms for transferring the successive signature-groups from the delivery of the gathering mechanism and feeding them into position at the proper height within the successive clamps.

3. A book-binding machine including, in combination, a signature-gathering mechanism; a binding mechanism comprising a series of upright signature-group clamps, each constructed with open bottom to hold and convey a signature-group with its back edge at the proper height, means for causing the clamps to travel successively through the machine, and means for automatically causing the closing of the successive clamps upon the transferred signature-groups; and mechanism intermediate said gathering and binding mechanisms for transferring the successive signature-groups from the delivery of the gathering mechanism and carrying each signature-group to the proper height within its clamp.

4. A book-binding machine including, in combination, a signature-gathering mechanism; a binding mechanism comprising a series of upright signature-group clamps, each constructed with open bottom to hold and convey a signature-group with its back edge at the proper height, means for causing the clamps to travel successively through the machine, and means for automatically causing the closing of the successive clamps upon the transferred signature-groups; and mechanism intermediate said gathering and binding mechanisms for transferring the successive signature-groups from the delivery of the gathering mechanism and carrying each signature-group with a rising movement through the open bottom of its clamp to the proper height within the clamp.

5. A book-binding machine including, in combination, a signature-gathering mechanism; a binding mechanism comprising a series of signature-group clamps, means for causing the clamps to travel successively through the machine, and means for automatically causing the closing of the successive clamps upon the transferred signature-groups; and mechanism intermediate said gathering and binding mechanism for transferring the successive signature-groups from the delivery of the gathering mechanism and feeding them into the successive clamps, comprising a signature-group holder swingingly movable for swinging a signature-group from its flatwise gathered position to upright position, and means for actuating said holder.

6. A book-binding machine including, in combination, a signature-gathering mechanism; a binding mechanism comprising a series of signature-group clamps, means for causing the clamps to travel successively through the machine, and means for automatically causing the closing of the successive clamps upon the transferred signature-groups; and mechanism intermediate said gathering and binding mechanisms for transferring the successive signature-groups from the delivery of the gathering mechanism and feeding them into the successive clamps, comprising a signature-group holder swingingly movable for swinging a signature-group from its flatwise gathered position to upright position, means for actuating said holder, and means for subsequently causing each signature-group to enter with a rising movement into its clamp.

7. A book binding machine including in combination a signature gathering mechanism, a binding mechanism comprising a clamp, and means intermediate said gathering and binding mechanisms for transferring each signature-group from the delivery of the gathering mechanism to said clamp; said transferring means comprising a movable holder adapted to successively receive and carry signature-groups from said gathering machine and a contrivance for moving each such group from said holder to said clamp, and means for automatically causing the closing of said clamp upon said signature group.

8. A book binding machine including in combination, a signature gathering mechanism, a binding mechanism comprising a clamp, and means intermediate said gathering and binding mechanisms for transferring each signature-group from the delivery of the gathering mechanism to said clamp; said transferring means comprising a swinging holder adapted to receive signature-groups substantially flatwise and swing them to upright position, and a lifter for lifting such groups from said holder into said clamp.

9. A book binding machine including in combination a signature gathering mechanism, a binding mechanism comprising a clamp, and means intermediate said gathering and binding mechanisms for transferring each signature-group from the delivery of the gathering mechanism to said clamp; said transferring means comprising a swinging holder adapted to receive signature-groups substantially flatwise and swing them to upright position, a retaining part opposed to the upright holder position, and a lifter for lifting such groups from said holder into said clamp.

10. A book binding machine including in combination a signature gathering mechanism, a binding mechanism comprising a clamp, and means intermediate said gathering and binding mechanisms for transferring each signature-group from the delivery of the gathering mechanism to said clamp; said transferring means comprising a lifter adapted to lift each such group into said clamp and a device for causing lateral adjustment of the group in said clamp.

11. A book binding machine including in combination a signature gathering mechanism, a binding mechanism comprising a clamp, and means intermediate said gathering and binding mechanisms for transferring each signature-group from the delivery of the gathering mechanism to said clamp; said transferring means comprising a lifter adapted to lift each such group into said clamp and a device for causing said lifter to take an inclined direction of movement for effecting lateral adjustment of the group in said clamp.

12. A book binding machine including in combination a signature gathering mechanism, a binding mechanism comprising a clamp, and means intermediate said gathering and binding mechanisms for transferring each signature-group from the delivery of the gathering mechanism to said clamp; said transferring means comprising a swinging holder adapted to receive signature-groups substantially flatwise and swing them to upright position, a lifter for lifting such groups from said holder into said clamp, and a device for causing lateral adjustment of the group in said clamp.

13. A book binding machine including in combination a signature gathering mechanism, a binding mechanism comprising a clamp, and means intermediate said gathering and binding mechanisms for transferring each signature-group from the delivery of the gathering mechanism to said clamp; said transferring mechanism comprising a contrivance for reaching to the said gathering mechanism delivery and drawing a group therefrom and a contrivance for moving such group into said clamp.

14. A book binding machine including in combination a signature gathering mechanism, a binding mechanism comprising a clamp, and means intermediate said gathering and binding mechanisms for transferring each signature-group from the delivery of the gathering mechanism to said clamp; said transferring mechanism comprising a contrivance constructed, fitted and actuable to reach to the said gathering mechanism delivery and to engage and draw a group therefrom, a holder adapted to receive a group so drawn from the gathering mechanism, and constructed and fitted to swing it to upright position, and a contrivance for moving such group from the holder upward into said clamp.

15. A book binding machine including in combination a signature gathering mechanism, a binding mechanism comprising a clamp, and means intermediate said gathering and binding mechanism for transferring each signature-group from the delivery of the gathering mechanism to said clamp, and means coöperating therewith for causing the opening and closing of said clamp; said transferring means comprising a swinging holder adapted to receive signature-groups substantially flatwise and swing them to upright position, and a lifter for lifting such groups from said holder into said clamp.

16. A book binding machine including in combination a transferring mechanism, a gathering mechanism adapted to present signature-groups successively to said transfer mechanism, a binding mechanism having traveling clamps adapted to be presented successively to said transfer mechanism, said transfer mechanism constructed and adapted to receive a signature-group substantially flatwise, set it on edge, insert it into one of said clamps, and bring about its clamping therein.

17. A book binding machine including in combination a transferring mechanism, a gathering mechanism adapted to present signature-groups successively to said transfer mechanism, a binding mechanism having traveling clamps adapted to be presented successively to said transfer mechanism, said transfer mechanism constructed and adapted to receive a signature-group substantially flatwise, set it on edge, insert it into one of said clamps, and bring about its clamping therein, and adjust it there.

18. A transfer mechanism for book binding or analogous machines including in combination a swinging holder constructed and located to have objects successively fed substantially flatwise to it, means for swinging said holder from a substantially flatwise to an upright position, and means for moving an object from the upright holder into engagement with a clamp or the like.

19. A transfer mechanism for book binding or analogous machines including in combination a swinging holder constructed and located to have objects successively fed substantially flatwise to it, means for swinging said holder from a substantially flatwise to an upright position, a retaining part located to oppose the holder when in upright position, and means for moving an object from the upright holder into engagement with a clamp or the like.

20. A transfer mechanism for book binding or analogous machines including in combination a holder constructed and located to have objects successively fed to it, and a contrivance for moving an object from said holder to a clamp, said contrivance comprising a plurality of studs constructed and located to have each object rest edgewise thereon and having means for causing vertical movement of such studs.

21. A transfer mechanism for book binding or analogous machines including in combination a holder constructed and located to have objects successively fed to it, and a contrivance for moving an object from said holder to a clamp, said contrivance comprising a plurality of studs constructed and located to have each object rest edgewise thereon and having means for causing vertical movement of such studs, and the said holder having one or more stud-receiving slots.

22. A transfer mechanism for book binding or analogous machines including in combination a swinging holder constructed and located to have objects successively fed substantially flatwise to it, means for swinging said holder from a substantially flatwise to an upright position, a retaining part located to oppose the holder when in upright position, and a contrivance for moving an object from the upright holder into engagement with a clamp, said contrivance adapted to have each object rest edgewise thereon and having means for causing the member's vertical movement.

23. A transfer mechanism for book binding or analogous machines including in combination a swinging holder constructed and located to have objects successively fed substantially flatwise to it, means for swinging said holder from a substantially flatwise to an upright position, a retaining part located to oppose the upright holder when in upright position, and a contrivance for moving an object from the upright holder into engagement with a clamp, said contrivance comprising a plurality of studs constructed and located to have each object rest edgewise thereon and having means for causing vertical movement of such studs, and the said retaining part having one or more stud-receiving slots.

24. A transfer mechanism for book binding or analogous machines including in combination a holder constructed and located to have objects successively fed to it, a contrivance for moving an object from said holder to a clamp, a stop oscillated with said clamp and means for laterally adjusting the object toward said stop after the object has been moved to said clamp.

25. A transfer mechanism for book binding or analogous machines including in combination a holder constructed and located to have objects successively fed to it, a contrivance for moving an object from said holder to a clamp comprising vertically and laterally movable studs, a stop oscillated with said clamp and means for laterally adjusting the object toward said stop after the object has been moved to said clamp comprising inclined slots engaged by said studs.

26. A transfer mechanism for book binding or analogous machines including in combination a holder constructed and located to have objects successively fed to it, a clamp, means for moving an object from said holder to said clamp, and a reciprocating contrivance for reaching out to a support at one side and drawing an object therefrom on to said holder, said contrivance including a to-and-fro moving arm and a movable finger carried thereby.

27. A transfer mechanism for book binding or analogous machines including in combination a holder constructed and located to have objects successively fed to it, a clamp, means for moving an object from said holder to said clamp, and a reciprocating contrivance for reaching out to a support at one side and drawing an object therefrom on to said holder, said contrivance including an oscillating arm, a movable finger carried thereby, and a mechanical movement for causing the finger on each instroke to pass into object-engaging position, and on each outstroke to pass out of such position.

28. A transfer mechanism for book binding or analogous machines including a holder, a contrivance for reaching out to a support at one side and drawing an object therefrom on to said holder, said contrivance including an oscillating arm, a movable finger carried thereby, and a mechanical movement for causing the finger on each instroke to pass into object-engaging position, and on each outstroke to pass out of such position, said mechanical movement including a friction sleeve, a lever pivoted on said arm and connected to said sleeve and a link extending from said lever to said finger.

29. In combination with a clamp, a transfer mechanism for book binding machines including a holder located below said clamp and adapted to swing from substantially flatwise to substantially upright position, a lifting contrivance, constructed and fitted to operate upon an object in said holder, and a single machine part having connections for effecting operations in the following order; holder swings up raising object to upright position, lifter lifts object from holder to clamp, and parts resume original positions.

30. In combination with a clamp, a transfer mechanism for book binding machines including a holder located below said clamp and adapted to swing from substantially flatwise to substantially upright position, a lifting contrivance, constructed and fitted to operate upon an object in said holder, a clamp-operating device and a single machine part having connections for effecting operations in the following order: holder swings up raising object to upright position, lifter lifts object from holder to clamp, clamp operating device causes clamp to close, and parts resume original positions.

31. In combination with a clamp, a transfer mechanism for book binding machines including a holder located below said clamp and adapted to swing from substantially flatwise to substantially upright position, an out-and-in-moving reaching device adapted to engage and draw an object to said holder, a lifter, constructed and fitted to operate upon an object in said holder, a clamp operating device, and a single machine part having connections for effecting operations in the following order: reaching device engages and draws object inward to holder, holder swings up raising object to upright position, lifter lifts object from holder to clamp, clamp operating device causes clamp to close, and parts resume original position.

Signed at Champlain, in the county of Clinton, State of New York, this 1st day of February, 1917.

ALFRED BREDENBERG.